United States Patent [19]

Banks

[11] 3,937,051
[45] Feb. 10, 1976

[54] BELLOWS FORMING METHOD AND APPARATUS

[75] Inventor: James W. Banks, Bozman, Md.

[73] Assignee: Chemetron Corporation, Chicago, Ill.

[22] Filed: May 30, 1974

[21] Appl. No.: 474,726

[52] U.S. Cl. .................................. 72/110; 72/105
[51] Int. Cl.² ...................................... B21D 15/06
[58] Field of Search ............. 72/105, 106, 107, 110, 72/450; 29/454

[56] References Cited
UNITED STATES PATENTS

| | | | |
|---|---|---|---|
| 220,991 | 10/1879 | Ross | 72/105 |
| 1,456,069 | 5/1923 | Mallory | 72/105 |
| 3,435,651 | 4/1969 | McInnis | 72/105 |
| 3,509,747 | 5/1970 | Ogilvie | 72/450 |

FOREIGN PATENTS OR APPLICATIONS

| | | | |
|---|---|---|---|
| 801,628 | 9/1958 | United Kingdom | 72/107 |

Primary Examiner—Lowell A. Larson
Attorney, Agent, or Firm—N. M. Esser

[57] ABSTRACT

In bellows forming with internal and external forming rolls, the external forming roll is rigidly supported, as each convolution is formed in a blank, to permit accurate control of each convolution. The blank is indexed independently of the convolutions.

7 Claims, 7 Drawing Figures 3,937,051

BELLOWS FORMING METHOD AND APPARATUS

BACKGROUND OF THE INVENTION

This invention pertains to bellows forming generally as disclosed in U.S. Pat. No. 3,429,160, whereby a series of circumferential convolutions are formed in the elongated tubular wall of a flexible metal blank. Such bellows have many uses, typically in expansion joints for power plants, nuclear reactors, and other systems.

In known methods to form such bellows, interior and exterior forming rolls are brought together against opposite sides of the wall of the blank, as the blank is rotated about its axis, to form each convolution in the wall of the blank. As in U.S. Pat. No. 3,429,160, the exterior forming rolls are carried by two bell crank arms actuated by hydraulic means, which may not provide sufficient rigidity, as the interior forming roll is forced against the wall of the blank, to provide accurate dimensional control of each convolution.

In such methods, the blank must be indexed manually, by approximate reference to each previously formed convolution, for each convolution to be successively formed. Hence, any dimensional errors from one convolution to the next tend to be cumulated.

SUMMARY OF THE INVENTION

Generally, the object of this invention is to provide certain improvements in bellows forming whereby each convolution in the elongated tubular wall of a flexible metal blank may be formed with greater dimensional accuracy than has been possible with known methods of bellows forming.

A more particular object of this invention is to provide an improvement in bellows forming, generally as described above, whereby an exterior forming roll assembly is supported rigidly as an interior forming roll is forced against the elongated tubular wall of a flexible metal blank being rotated about its axis.

Another more particular object of this invention is to provide an improvement in bellows forming, generally as described above, whereby the blank is indexed independently of each previously formed convolution to provide uniform spacing between successive convolutions.

These objects and other objects of this invention will be evident from the following detailed description, with particular reference to the several accompanying drawings, of a preferred embodiment of this invention.

DETAILED DESCRIPTION OF PREFERRED EMBODIMENT

Figure 1:
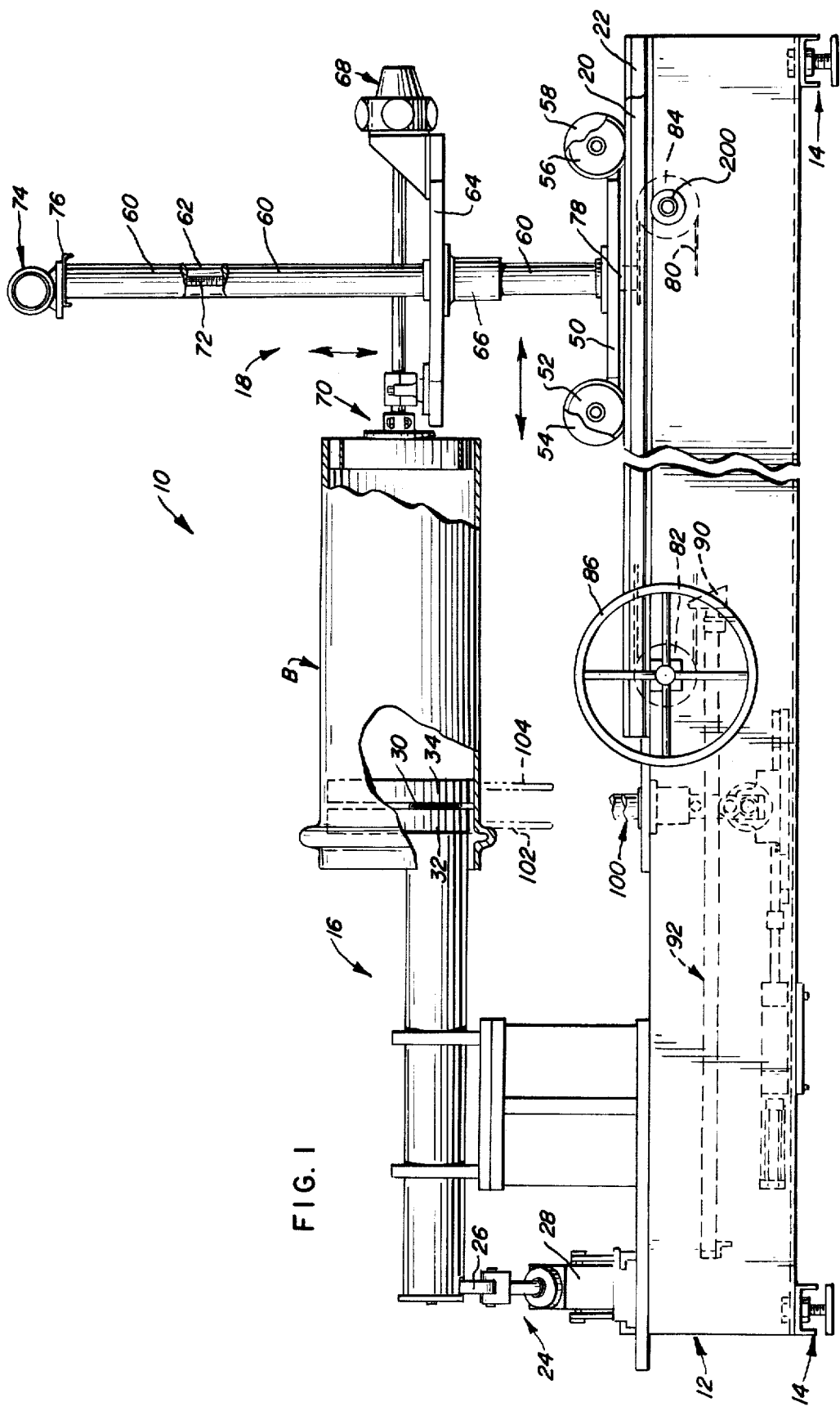
FIG. 1 is a partly fragmentary side elevational view of a bellows forming machine.

The drawings illustrate a bellows forming machine 10 designed to form a bellows having circumferential (cf. helical) convolutions from a flexible metal blank B having an elongated tubular wall. The utility of such bellows in expansion joints for power plants, nuclear reactors, and other systems is well known.

The bellows forming machine 10 generally comprises a rigid fabricated frame 12, which is supported on several adjustable leveling legs 14, a headstock assembly 16, which is supported by the frame 12, and a tailstock assembly 18, which is movable along parallel rails 20 and 22 fixed to the frame 12. Various parts of the frame are commonly designated by reference number 12.

The headstock assembly 16 comprises a mechanism 24, which converts rotary motion imparted to a crank 26 by hydraulic means 28 to vertical motion of an interior forming roll 30 and a pair of supporting rings 32 and 34, over which the blank B is indexed and which rotate conjointly with the blank B\*. The rings 32 and 34\*\* various blanks of different diameters.

\*on suitable rollers (not shown) supported by the mechanism 24
\*\*, which support and centrally locate the blank B as each convolution is formed, can be interchanged with similar rings of differing dimensions The mechanism 24 is described in copending application Ser. No. 474,727, concurrently filed and commonly assigned herewith. Such application should be consulted for further details of the mechanism 24.

The tailstock assembly 18 comprises a truck 50, which has two pairs of flanged wheels 52–58 riding on the rails 20 and 22, and vertical columns 60 and 62, which are supported by the truck 50. A platform 64 is guided for vertical movement along the columns 60 and 62 by a pair of vertical collars 66 (one shown) mounted in suitable openings in the platform 64 and slidable along the respective vertical columns 60 and 62.

The platform 64 supports a motor 68 arranged to rotate a chuck 70 adapted to hold one end of the blank B in known manner for conjoint rotation of the chuck 70 and the blank. The chuck 70 may be of any suitable known type and may have expanding jaws (as suggested by FIG. 1) adjustable and replaceable for various blanks of different diameters. The platform 64 is adjustably positioned along the columns 60 and 62, as is required for various blanks of different diameters, by a suitably threaded worm 72 engaging a compatibly threaded follower (not shown) mounted to the platform 64 and being driven by a motor 74 supported by a cross-beam 76 mounted across the columns 60 and 62. Once positioned along the columns 60 and 62 to accomodate a blank of given diameter, the platform 64 remains where positioned while successive convolutions are formed in the elongated tubular wall of the blank B.

Figure 5:
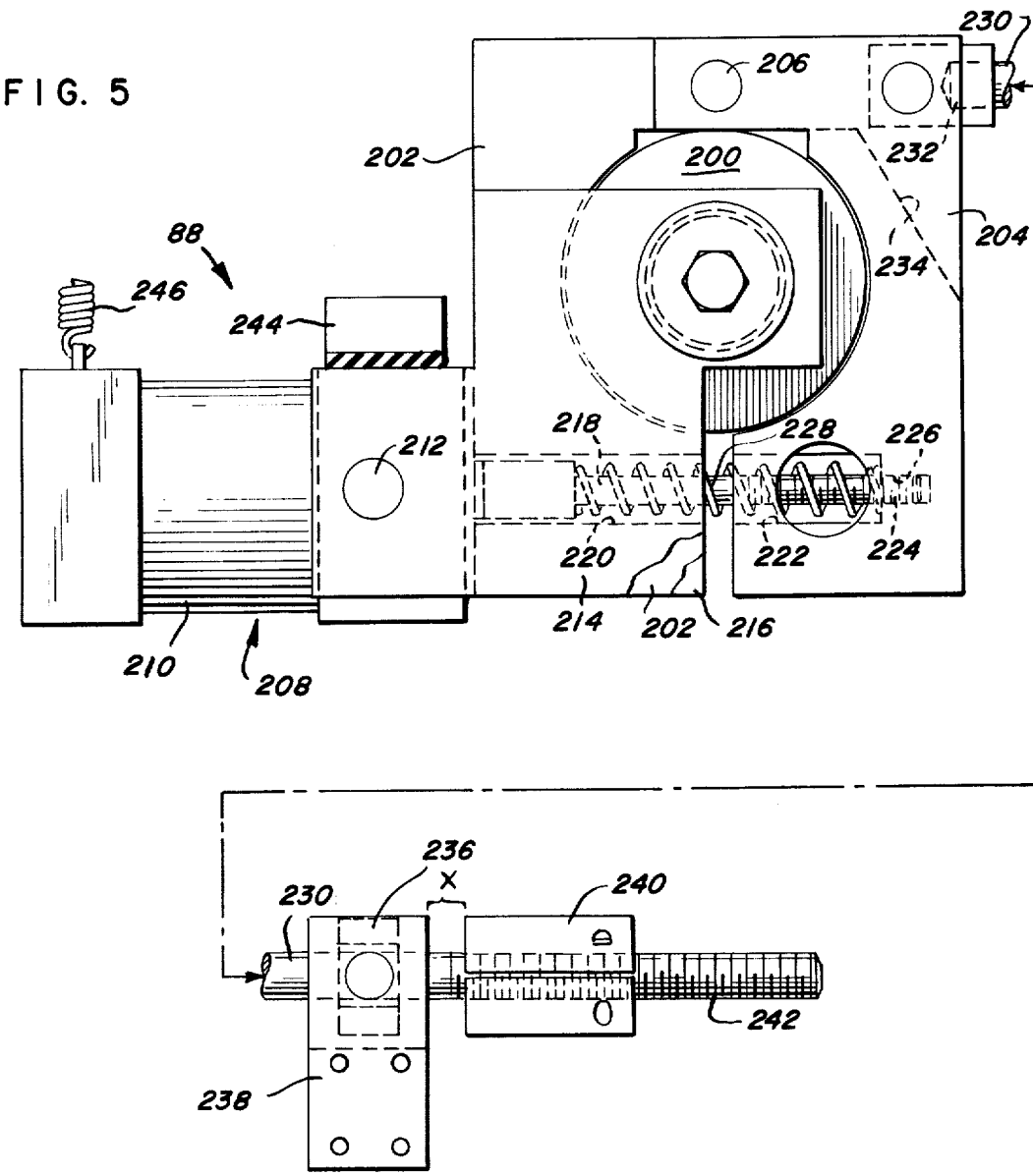
FIG. 5 is a side elevational detail of indexing mechanism bellows forming machine of FIG. 1.

The tailstock assembly 18 is coupled by a link 78 to an endless driving chain 80 entrained over spaced sprockets 82 and 84 suitably journalled on the frame 12. The sprocket 82 closer to the headstock assembly 16 has a handwheel 86 mounted externally of the frame 12 and rotatable conjointly with the sprocket 82 and therefore with the sprocket 84. The sprocket 84 is coupled to indexing mechanism 88 (FIG. 5) described below. The handwheel 86 is used for initial positioning of the blank B relative to the interior forming roll 30 and the exterior forming rolls 102 and 104 with the aid of suitable gauges (not shown). The chain 80 also is coupled by a link 90 to pneumatic mechanism 92 for moving the tailstock assembly 18 toward the headstock assembly 16. The aforementioned indexing mechanism 88 moves the tailstock mechanism 18 to each successive indexed position as each successive circumferential convolution is formed.

Figure 3:
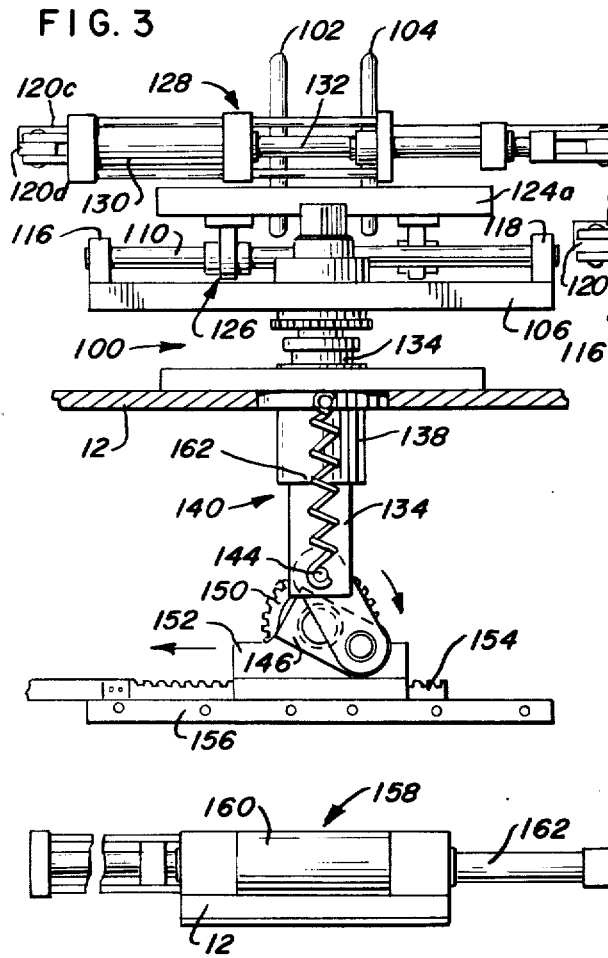
FIGS. 2 and 3 are respective changed-position views of the exterior forming roll assembly and associated components shown fragmentarily in FIG. 1.
Figure 2:
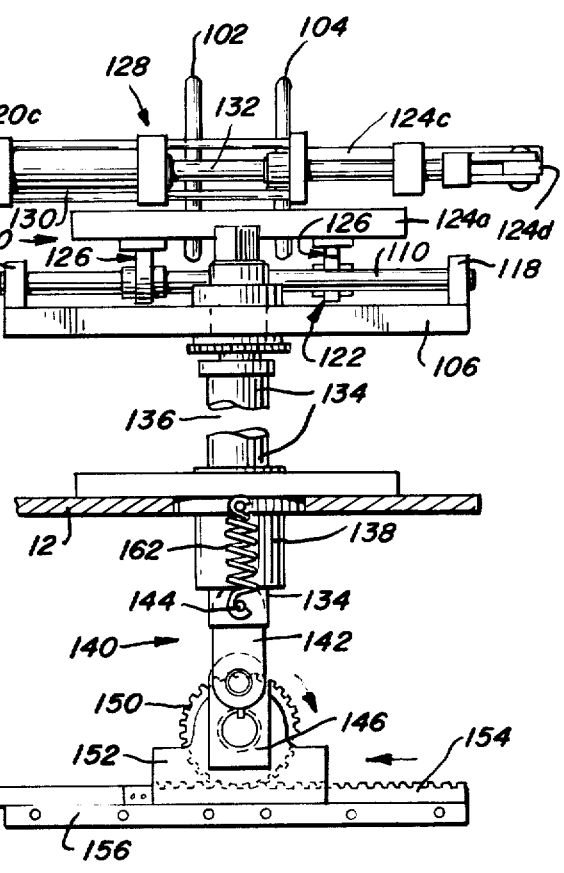
Figure 4:
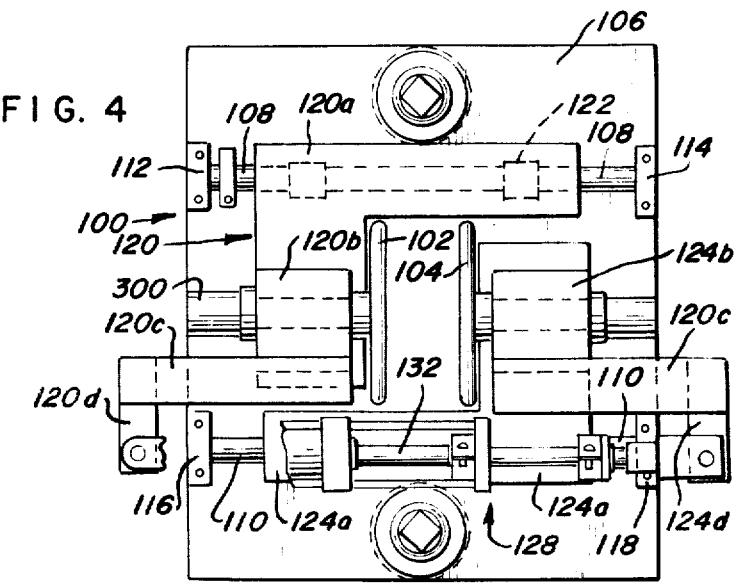
FIG. 4 is a top plan view of the components shown in FIGS. 2 and 3.

As indicated fragmentarily in FIG. 1 and particularly in FIGS. 2–4, an exterior forming roll assembly 100, which comprises forming rolls 102 and 104 and other components described below, is positioned generally beneath the upper forming roll 30. The interior forming roll 30 cooperates with the exterior forming rolls 102 and 104 to form each convolution in the elongated tubular wall of the blank B.

The assembly 100 further comprises a platform 106 supporting a pair of parallel rods 108 and 110 on vertical stanchions 112–118. A slider 120, which comprises a plurality of connected element 120a-120d is supported by bearing means 122 for sliding movement along the rod 108. The roll 102 is journalled to one element (120b as shown) of the slider 120. A slider 124, which comprises a plurality of connected elements 124a–124d, is supported by bearing means 126 for sliding movement along the rod 110. The roll 104 is journalled to one element (124b as shown) of the slider 124. The sliders 120 and 124* are interconnected by hydraulic mechanism 128 comprising a cylinder 130 connected by intermediate links (not numbered) to one element (120d as shown) of the slider 120 and a rod 132 connected similarly to one element (124d as shown) of the slider 124. As the rod 132 is drawn into the cylinder 130, the rolls 102 and 104 are drawn together (closed). As the rod 132 is drawn out of the cylinder 130, the rolls 102 and 104 are drawn apart (opened). In either instance the rolls 102 and 104 move coaxially.

*. which also are supported by bearing means (not shown) engaging a load-bearing way 300 (FIG. 4) mounted on the platform 106.

The platform 106 has two downwardly extending columns 134 and 136 (FIG. 2) passing through suitable collars 138 (one shown) mounted to the frame 12 and thus being capable of being lifted and lowered. The platform 106 is lifted and lowered by an elongated articulated linkage 140 supporting the platform 106 (and therefore the rolls 102 and 104) rigidly against downward movement when aligned (as in FIG. 2) and permitting downward movement of the platform 106 (and therefore the rolls 102 and 104) when not aligned (as in FIG. 3).

The linkage 140 comprises a first elongated link 142 pivotally connected to the column 134, as indicated at 144, and a second elongated link 146 pivotally connected to the link 142, as indicated at 148. The link 146 constitutes a crank conjointly rotatable with a rotatable toothed pinion 150 journalled within journal blocks 152 (one shown) mounted in the frame 12. An elongated toothed rack 154 engages the pinion 150 and is slidable along a slideway 156 mounted to the frame 12. Double-acting hydraulic means 158, which comprises a cylinder 160 supported by the frame 12 and a rod 162 coupled to the rack 152, reciprocates the rack 152 to rotate the pinion 150 (and therefore the link 146) and lift and lower the platform 106 (and therefore the rolls 102 and 104). A normally compressed spring 164 biases the platform 106 upwardly.

The aforementioned indexing mechanism 88 (FIG. 5) comprises a drum 200 (FIGS. 1 and 5) rotatable conjointly with the sprocket 84 closer to the tailstock assembly 18 and a pair of C-shaped brake shoes 202 and 204 connected to each other for pivotal movement about a pin 206 to sieze the drum 200 when pivotally drawn together (closed) and to release the drum 200 when pivotally separated (opened). Pneumatic mechanism 208 is used to open and close the shoes 202 and 204. The mechanism 208 comprises a cylinder 210, which is pivotally mounted (as indicated at 212) between parallel plates 214 and 216 mounted to opposite sides of the shoe 202, and a rod 218, which extends through suitable passages 220 and 222 in the respective shoes 202 and 204 and is connected (at one suitably threaded end 224) to a suitably threaded socket 226 in the shoe 204. A spring 228, which is piloted over the rod 218 biases the shoes 202 and 204 apart.

A rod 230, which is pivotally connected at one end 232 to the shoe 204 between opposite walls of a groove 234 provided in the shoe 204, is slidably extended through a bearing 236 pivotally mounted between opposite walls of a U-shaped support 238 supported by the frame 12. Sliding movement of the rod 230 is limited to a precisely adjusted spacing x (FIG. 5) by an adjustably positioned stop 240 threaded onto a suitable threaded portion 242 of the rod 230.

Rotatable movement of the shoes 202 and 204 conjointly with the drum 200 (and therefore with the sprocket 84) in one direction is limited by the stop 240 engaging the support 238. Rotatable movement of these components in the opposite direction is limited by the cylinder 210 engaging a resiliently padded stop 244 supported by the frame 12. A spring* causes the shoes 202 and 204 to return, when released, to their "rest" positions of FIG. 1.

* 246, which connects the cylinder 210 to the frame 12.

To index the blank B for each convolution, hydraulic mechanism 208 is energized to close the shoes 202 and 204 tightly around the drum 200. Immediately, pneumatic mechanism 92 is energized to move the tailstock assembly 18 and the blank B toward the headstock assembly 16 until the rotation of the shoes 202 and 204 is limited by the stop 240 engaging the support 238. When the tailstock assembly 18 has stopped, the exterior roll assembly 128 is lifted and the interior forming roll 30 is forced into the wall of the blank B, which is being rotated by the motor 68, as the exterior forming rolls 102 and 104 are closed together. After the roll 30 has begun to form the convolution, pneumatic mechanism 208 is deenergized to release the shoes 202 and 204, while pneumatic mechanism 92 continues to move the tailstock assembly 18 until deenergized as the convolution is nearly completed, whereupon the exterior roll assembly 128 and the interior forming roll 30 are retracted. These steps are repeated to form each successive circumferential convolution.

Figure 6:
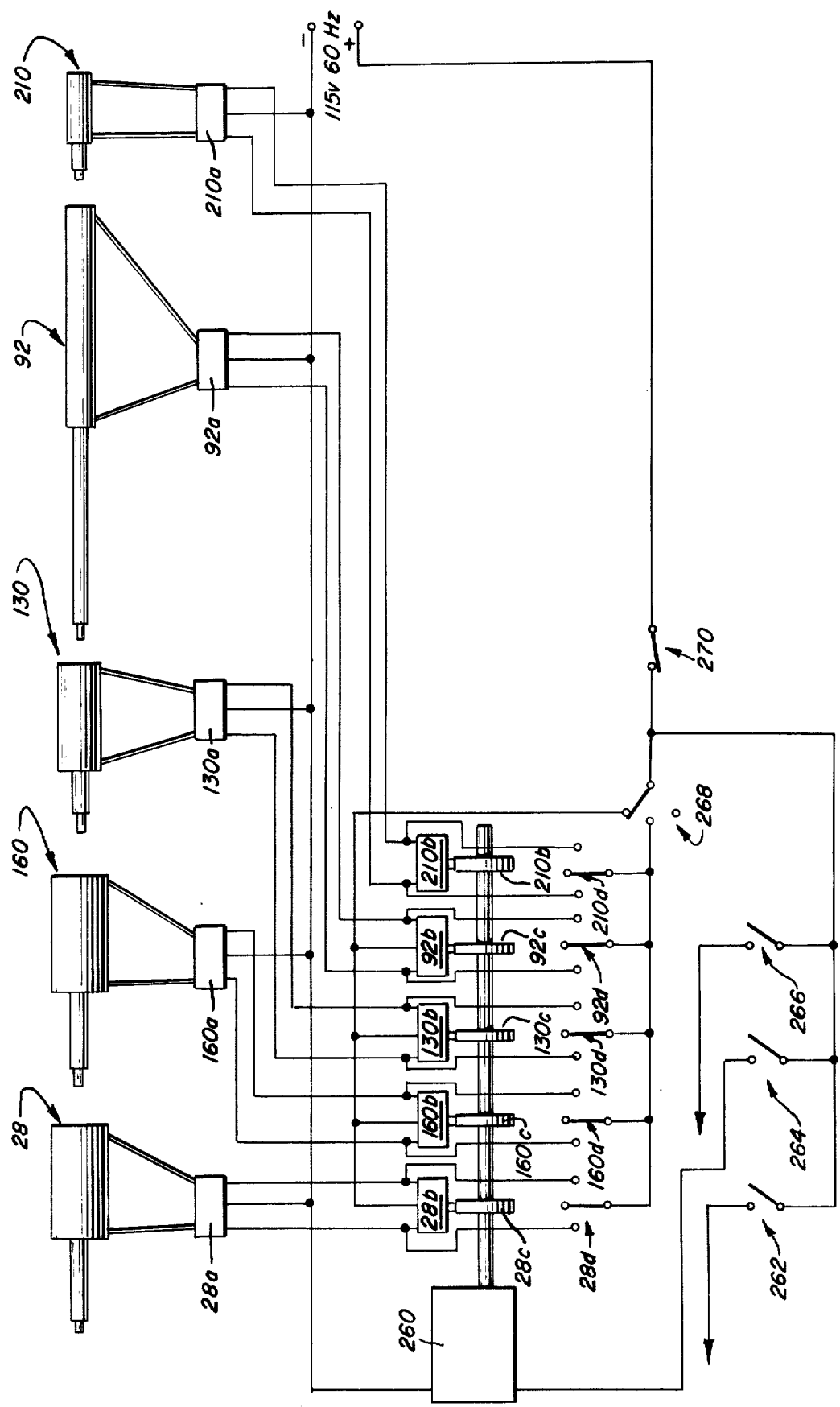
FIG. 6 is a diagram of the cam-actuated switches, hydraulic components, and associated circuitry of the bellows forming machine of FIG. 1.
Figure 7:
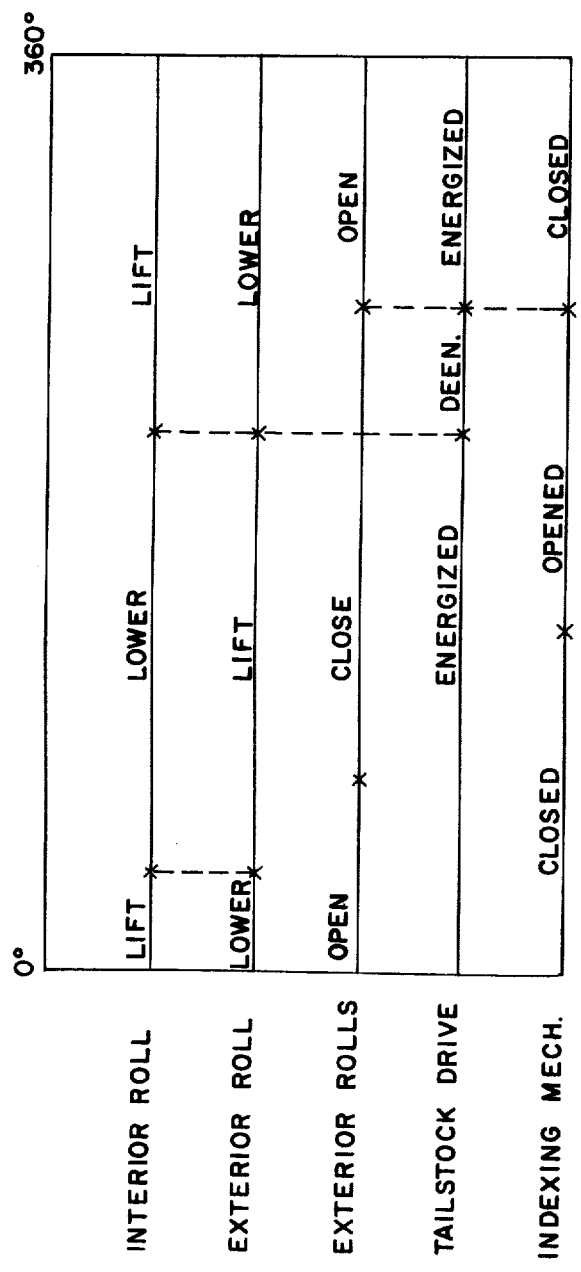
FIG. 7 is a diagram of the approximate phase relationships among various components during a cycle of the bellows forming machine of FIG. 1.

As indicated in FIG. 6, fluid power to hydraulic means 28, which is included in the mechanism 24 described in the aforementioned copending application, hydraulic cylinder 160, which operates to lift and lower the exterior roll assembly 128, hydraulic mechanism 130, which operates to open and close the exterior forming rolls 102 and 104, pneumatic mechanism 92, which operates to move the tailstock assembly 18, and pneumatic mechanism 210, which operates to open and close the shoes 202 and 204 of indexing mechanism 88, is controlled by solenoid valves 28a, 160a, 130a, 92a, and 210a, respectively. The respective solenoid valves are energized through micro-switches 28b, 160b, 130b, 92b, and 210b, respectively, which are actuated (with the respective phase relationships approximated by FIG. 7 for each convolution forming cycle) by conjointly rotated profile cams 28c, 160c, 130c, 92c, and 210c, respectively. The respective profile cams are rotated at a suitable selected speed by a constantspeed D.C. motor 260.

The respective solenoid valves also may be controlled manually through parallel-connected single-pole multiple-throw switches 28d, 160d, 130d, 92d, and 210d, respectively. A switch 262 is provided to start and stop a pump (not shown) to pump hydraulic fluid to the respective hydraulic cylinder. Another switch 264 is provided to start and stop the motor 260. Another switch 266 is provided to start and stop the motor 68 (FIG. 1).

The several aforementioned switches are connected in parallel circuits as indicated in FIG. 6. A switch 268 is suitable provided to* switches controlling the respective solenoid valves. Another switch 270 is suitably provided as an emergency "stop" switch. The switches 268 and 270 are connected as indicated in FIG. 6.
* energize selectively the cam-operated switches and the manually operated switches.

These features permit each convolution to be formed with great precision and dimensional control, with uniform spacing between successive convolutions, and without cumulative error. The bellows produced on the bellows forming machine 10 thus have significant advantages over a bellows produced by the techniques previously known to the art.

I claim:

1. In a bellows forming machine of the type including a frame, a rotatable chuck adapted to hold a blank having an elongated tubular wall and a longitudinal central axis to be formed into a bellows having circumferential convolutions, support means for movably mounting said chuck on said frame, rotating means for rotating said chuck and the blank about the axis of the blank, forming means including an interior forming roll and an exterior forming roll positionable on opposite sides of the wall and relatively movable toward and away from each other and thus toward and away from the wall for forming a circumferential convolution in the wall upon relative motion of the rolls toward the wall as said chuck and the blank are rotated conjointly about the axis of the blank, biasing means for biasing said support means toward said interior forming roll and indexing means for indexing said chuck and the blank along the axis to allow successive convolutions to be formed similarly in the wall, the improvement wherein said indexing means comprises means selectively engageable with said support means and movable by said biasing means, as said interior and exterior rolls clear the convolution, between a first engaged position to a second engaged position, for corresponding movement of said chuck and the blank for forming of a successive convolution.

2. The bellows forming machine of claim 1 wherein said support means further comprises a rotatably mounted shaft and said selectively engageable means is a clutch arranged to seize and release said shaft alternately and to permit said shaft when seized to rotate via said biasing means only through a predetermined angular range and thus to permit said chuck to move only through a predetermined linear range.

3. The bellows forming machine of claim 1 further comprising adjusting means for varying said second position and hence the movement of said chuck and the blank.

4. The bellows forming machine of claim 3 further comprising another exterior forming roll and wherein said interior forming roll is positionable between said exterior and said another exterior forming roll.

5. The bellows forming machine of claim 4 further comprising means for moving said exterior rolls toward each other when forming a convolution and apart after forming a convolution.

6. A method of forming a bellows having circumferential convolutions from a blank having an elongated tubular wall and a longitudinal central axis comprising the steps of positioning an inner forming roll and an outer forming roll on opposite sides of said wall, forming a first circumferential convolution in said wall by rotating said blank about said axis while forcing said inner forming roll toward said outer forming roll, biasing said blank along said axis toward said inner forming roll while forming said convolution, retracting said inner and outer forming rolls from said convolution and indexing said blank a predetermined distance along said axis as said inner and outer rolls clear said convolution for a successive convolution.

7. The method of claim 6 in which another outer forming roll is positioned adjacent said outer forming roll and said inner forming roll is positioned therebetween and further comprising biasing said outer forming rolls toward said inner forming roll while forming said convolution.

* * * * *